No. 680,846. Patented Aug. 20, 1901.
W. M. DOWNEN.
PLOW ATTACHMENT.
(Application filed Apr. 30, 1901.)
(No Model.)
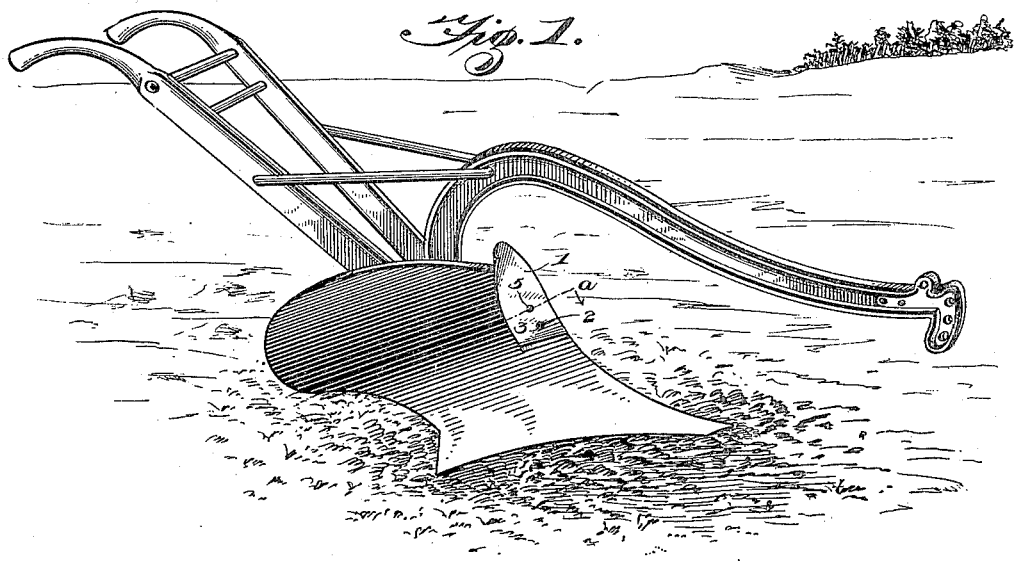
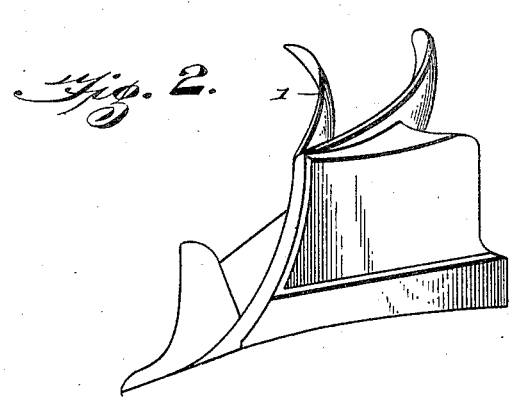
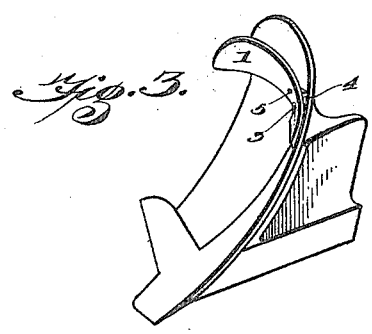
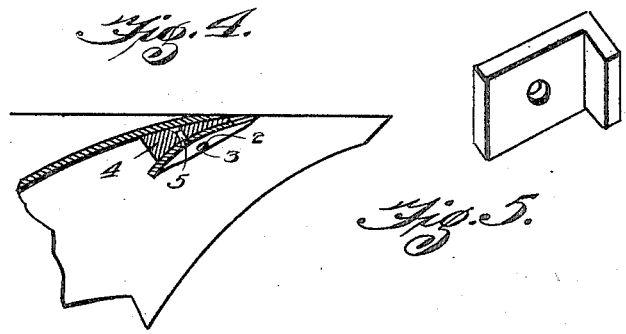
Witnesses
W. M. Downen, Inventor
by C. A. Snow & Co.
Attorneys

UNITED STATES PATENT OFFICE.

WILLIAM MARTIN DOWNEN, OF ST. JOHN, CALIFORNIA.

PLOW ATTACHMENT.

SPECIFICATION forming part of Letters Patent No. 680,846, dated August 20, 1901.

Application filed April 30, 1901. Serial No. 58,166. (No model.)

*To all whom it may concern:*

Be it known that I, WILLIAM MARTIN DOWNEN, a citizen of the United States, residing at St. John, in the county of Glenn and State of California, have invented a new and useful Plow Attachment, of which the following is a specification.

My invention is an improved plow attachment adapted especially to be attached to the moldboard of a turning-plow for turning under vegetable growths; and it consists in the peculiar construction and combination of devices hereinafter fully set forth and claimed.

In the accompanying drawings, Figure 1 is a perspective view of a plow provided with my improved turning attachment. Fig. 2 is a similar view showing the reverse side of the plowshare. Fig. 3 is a similar view at a different angle. Fig. 4 is a sectional view taken on a plane indicated by the line $a\,a$ of Fig. 1. Fig. 5 is a detail perspective view of a modified form of the brace-block.

My improved attachment is a wing 1, which forms a supplemental moldboard, may be of the form here shown or any other suitable form, and is adapted to be attached to the front side of a moldboard of a turning-plow near the upper edge of the latter.

My improved attachment has a bolt-opening 2, which registers with a bolt-opening in the moldboard of the plow when my attachment is appropriately located thereon, and a bolt 3 is employed to secure my attachment in place.

On the rear side of the wing or supplemental moldboard 1 at a suitable distance in rear of the bolt 3 is a brace-block 4, which is of wedge-like formation, as shown in Fig. 4, the said block being permanently secured to the rear side of the wing or supplemental moldboard 1, as by a rivet 5 or the like, and bearing against the face of the moldboard of the plow, hence maintaining the wing or supplemental moldboard 1 in appropriate position and at the required angle with relation to the plow-moldboard.

In operation the wing or supplemental moldboard 1, which curves forward at its upper end and laterally over the mold, as shown, operates on the vegetable growth to turn down the same immediately in advance of the mold which is being upturned by the following moldboard, so that the mold or slice as it is thrown off from the moldboard and overturned will bury the vegetation under it, thereby completely covering the vegetable growth.

The brace-block 4 may be modified in form and constructed of angle-iron, as shown in detail in Fig. 5.

Having thus described my invention, I claim—

1. A plow attachment comprising a wing, or supplemental moldboard adapted to be attached to a plow-moldboard, and having a brace-block on its rear side to bear against the face of the plow-moldboard, substantially as described.

2. In combination with a plow, a wing or supplemental moldboard bolted to the plow-moldboard and a wedge-like block secured between the opposing sides of the plow-moldboard and the supplemental moldboard to brace and sustain the latter in position, substantially as described.

In testimony that I claim the foregoing as my own I have hereto affixed my signature in the presence of two witnesses.

WILLIAM MARTIN DOWNEN.

Witnesses:
T. B. DRAKE,
D. A. BROWN.